United States Patent [19]
Janson et al.

[11] Patent Number: 4,966,246
[45] Date of Patent: Oct. 30, 1990

[54] FOUR WHEEL STEERING SYSTEM

[75] Inventors: David A. Janson, Plymouth; Jerome V. Glinski, Jr., East Detroit; David M. Preston, Madison Heights, all of Mich.

[73] Assignee: Eaton Corporation, Cleveland, Ohio

[21] Appl. No.: 364,413

[22] Filed: Jun. 12, 1989

[51] Int. Cl.$^5$ ............................ B62D 5/06; B62D 5/08
[52] U.S. Cl. ....................................... 180/140; 91/508; 280/91
[58] Field of Search ................. 180/140, 141; 280/91; 91/508

[56] References Cited

U.S. PATENT DOCUMENTS

| 4,313,514 | 2/1982 | Furukawa et al. | 180/143 |
| 4,621,702 | 11/1986 | Kanazawa et al. | 180/140 |
| 4,646,867 | 3/1987 | Kanazawa et al. | 180/140 |
| 4,666,013 | 5/1987 | Shibahata et al. | 180/141 |
| 4,671,523 | 6/1987 | Naumann | 280/91 |
| 4,697,816 | 10/1987 | Kawamoto et al. | 280/91 |
| 4,776,418 | 10/1988 | Winckler et al. | 180/140 |
| 4,776,419 | 10/1988 | Walton | 180/140 |
| 4,830,128 | 5/1989 | Winckler et al. | 180/140 |
| 4,830,129 | 5/1989 | Walton | 180/140 |
| 4,838,374 | 6/1989 | Walton | 180/140 |
| 4,860,845 | 8/1989 | Janson | 180/140 |
| 4,909,342 | 3/1990 | Janson et al. | 180/140 |

Primary Examiner—Mitchell J. Hill
Attorney, Agent, or Firm—P. S. Rulon

[57] ABSTRACT

A closed hydraulic system (22) is provided for transmitting steering movement to a rear wheel steering assembly (16) in response to steering movement of a front wheel steering assembly (14). The front wheel steering assembly is controlled by a steering wheel (18) and a power steering assembly (20). The closed hydraulic system (22) includes a pump assembly (56) and an actuator assembly (58) connected together by conduits (60,62) to define closed fluid flow branches (164,166) for moving a piston (112) in the actuator assembly in response to movement of a piston (78) in the pump assembly. Movement of the actuator piston is transmitted to the rear wheel steering assembly via first and second cam assemblies (122,124) which effect same direction rear wheel steering for rather small front wheel steering angles and which effect opposite direction rear wheel steering for greater front wheel steering angles. Pump assembly (56) includes first and second neutral valves (92,94) for intercommunicating opposite sides of the pump piston (78) with a chamber (83) when the piston is in a neutral position. System (22) also includes a reservoir (68) disposed above the normal fluid level of the system and exposed to atmospheric pressure.

20 Claims, 10 Drawing Sheets

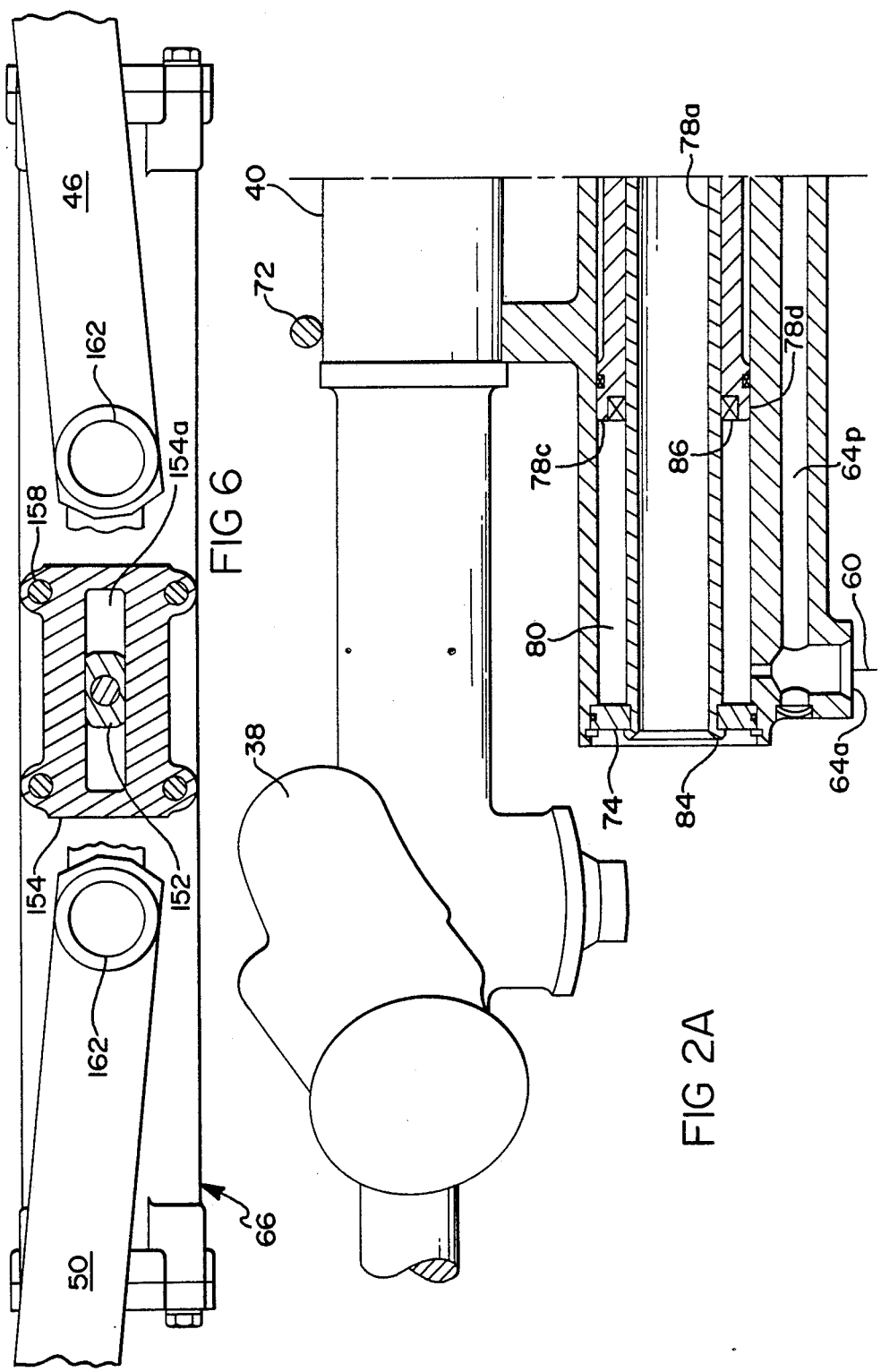

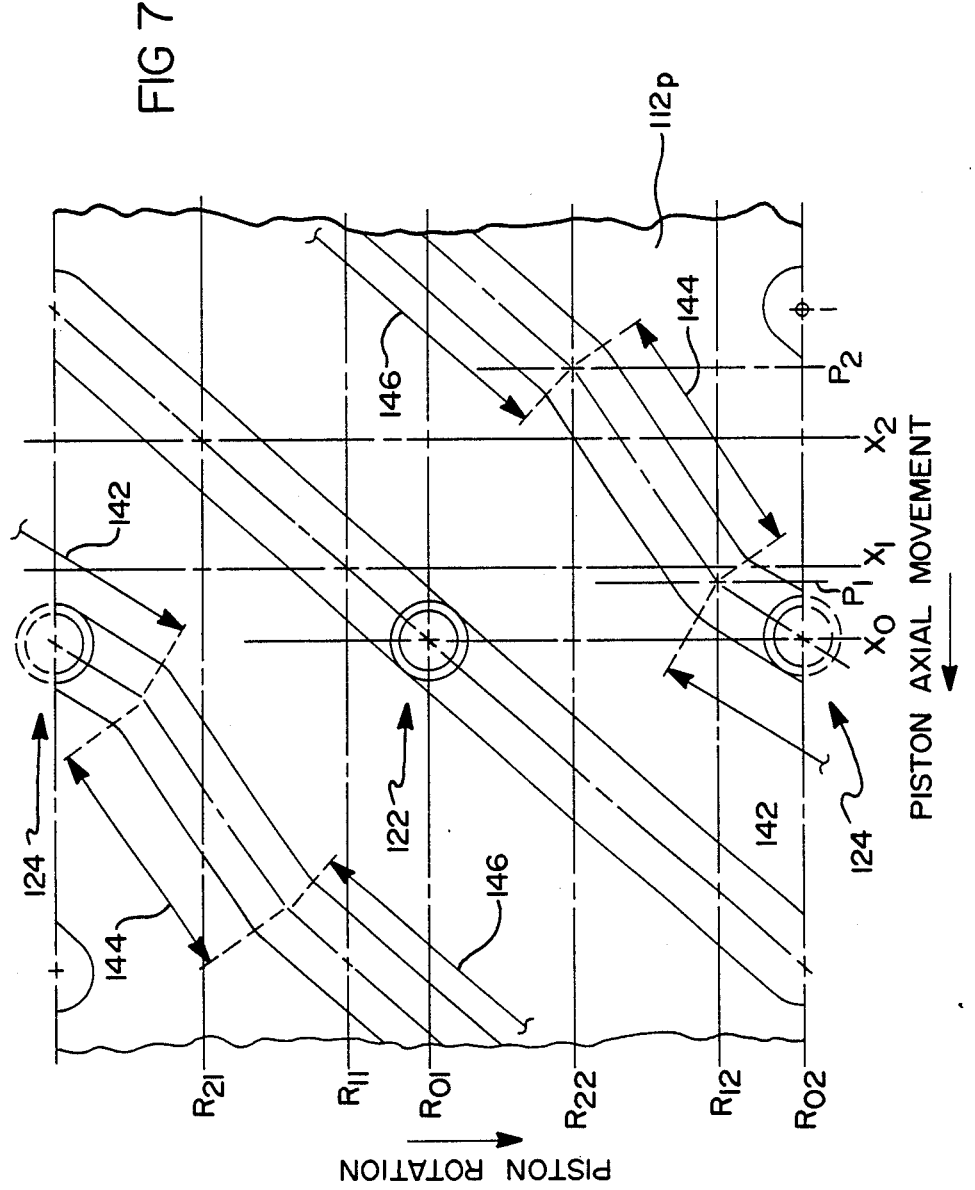

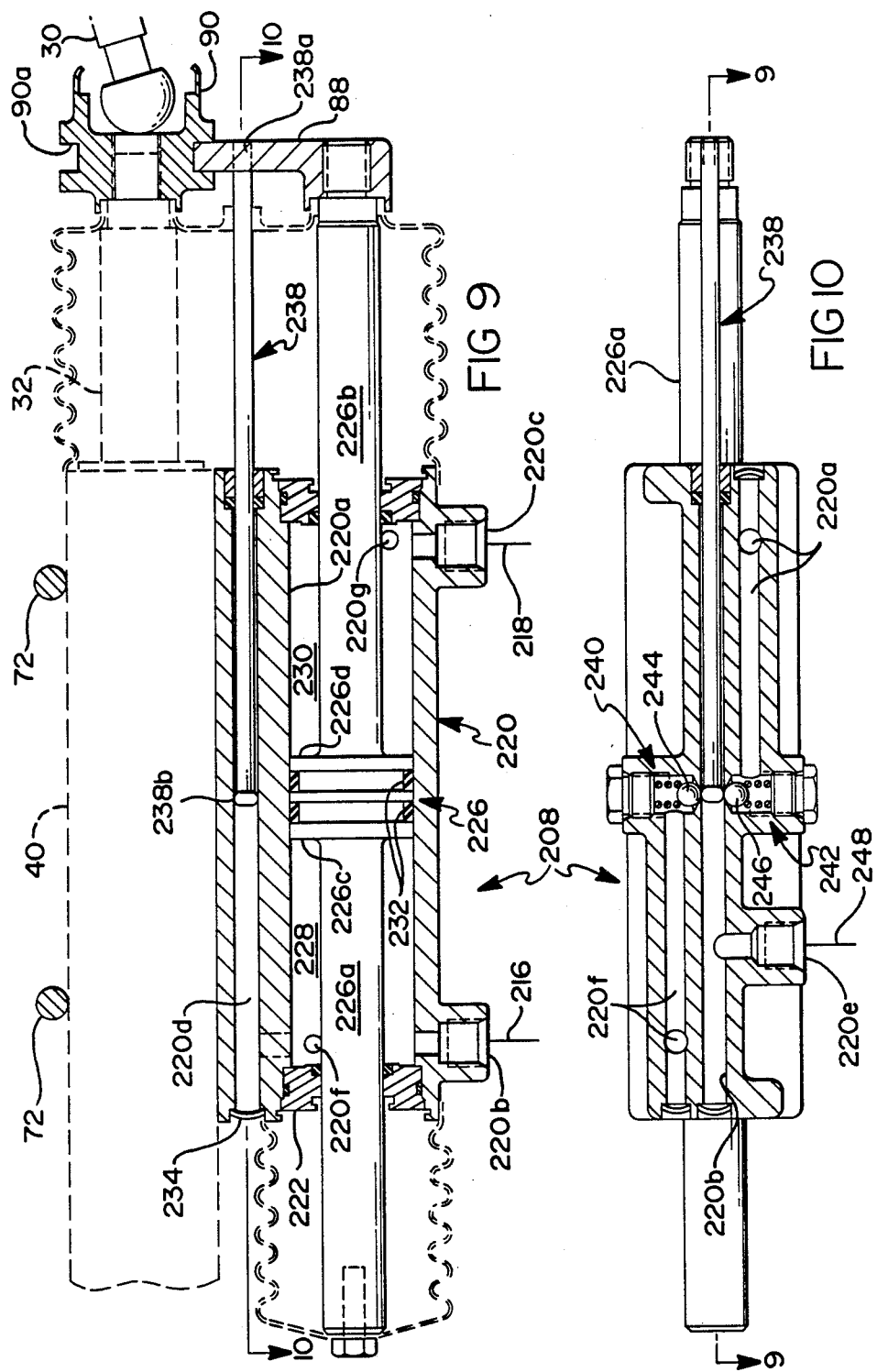

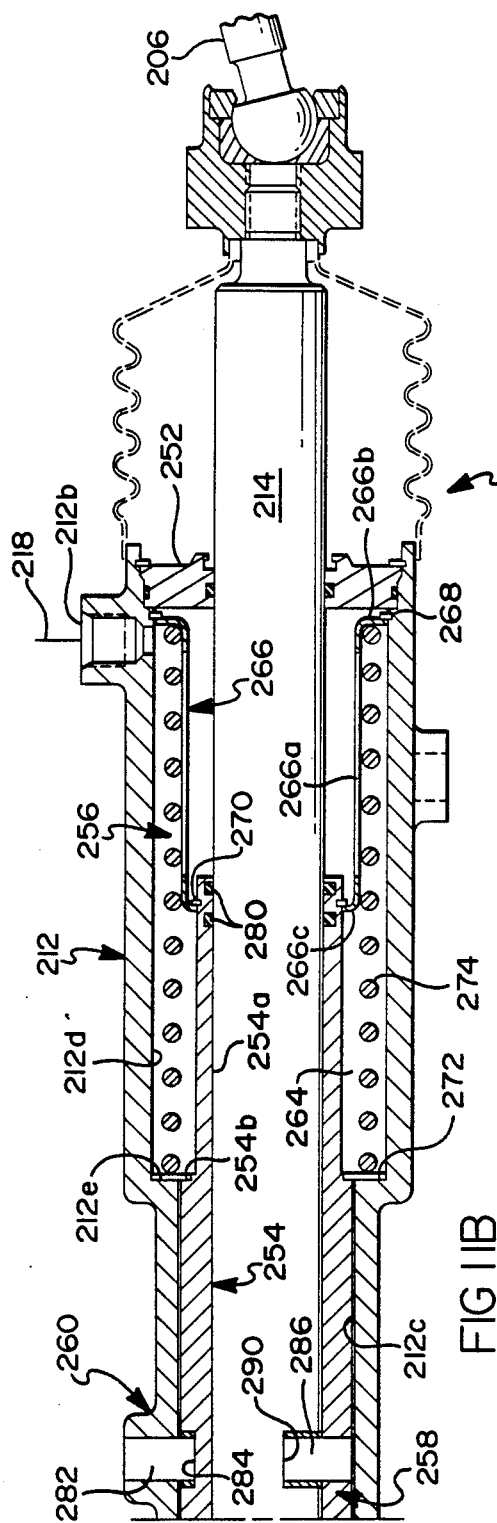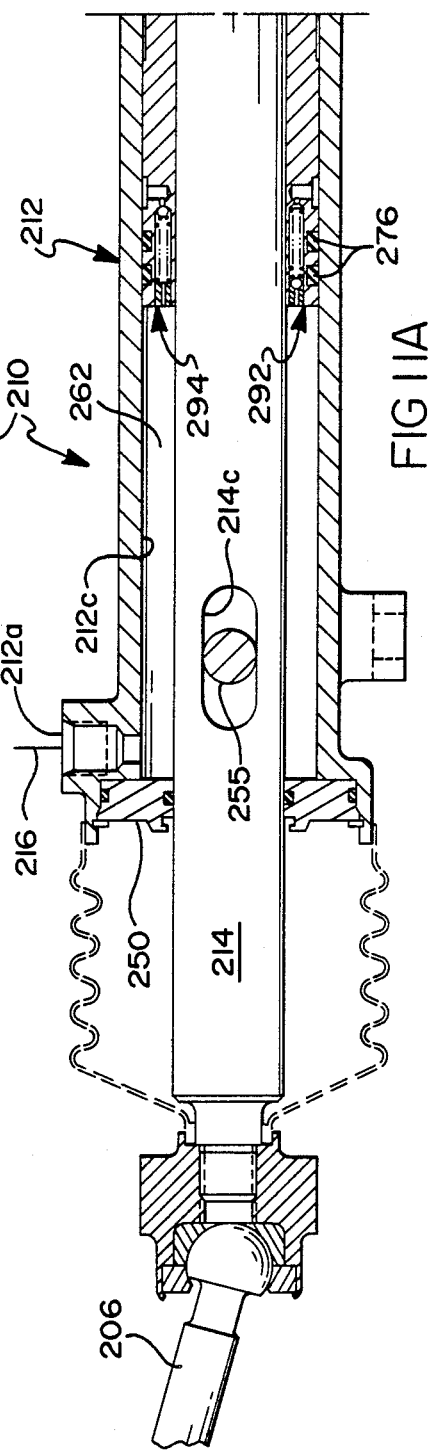

FOUR WHEEL STEERING SYSTEM

FIELD OF THE INVENTION

The present invention relates to four wheel steering. More specifically, the invention relates to apparatus for transmitting steering movement to a rear wheel steering assembly of a vehicle in response to steering movement of a front wheel steering assembly.

DESCRIPTION OF THE PRIOR ART

The purpose of four wheel steering is of course to reduce vehicle turning radius and/or to improve high speed maneuverability of the vehicle It is known to employ electrical, electrohydraulic, hydromechanical, or mechanical apparatus to transmit steering movement to rear wheel steering assemblies of vehicles in response to steering movement of front wheel steering assemblies. In practice, implementation of such apparatus has been expensive, has been somewhat unreliable, and/or has provided less than optimum performance. Further, hydromechanical and mechanical apparatus has been difficult to package into available vehicle space and have been difficult to protect against the harsh environment in which vehicles operate.

In a known four wheel steering system, steering movement of a front wheel steering assembly is transmitted to a rear wheel steering assembly via a mechanical apparatus in the form of a rotatably mounted shaft means extending longitudinally of the vehicle between the front and rear wheel steering assemblies. The rotatably mounted shaft means senses steering movement of the front wheel steering assembly and also transmits power for steering the rear wheel steering assembly. It is also known to convert this mechanical apparatus to a hydromechanical apparatus by connecting the output of the rotatably mounted shaft to a valve which ports pressurized hydraulic fluid from a motor driven pump to a power cylinder operative to transmit steering movement to the rear wheel steering assembly. It is also known to provide such mechanical and hydromechanical apparatus with a geared transmission operative to reverse the output direction of the rotatably mounted shaft means when the steering angle of the front wheel steering assembly exceeds a predetermined amount, thereby changing the steering direction of the rear wheels relative to the front wheels from the same direction to opposite direction.

In U.S. Pat. Nos. 4,776,418 and 4,776,419, both of which are incorporated herein by reference, there is disclosed a four wheel steering assembly including a closed hydraulic system for transmitting same and opposite direction steering movement to the rear wheels of a vehicle in response to steering movement of the front wheels. The closed hydraulic system includes a pump assembly and an actuator assembly connected together by conduits to define closed fluid flow branches for moving a piston in a housing of the actuator assembly in response to movement of a piston in a housing of the pump assembly. The ends of the pistons are sealed by roll diaphragms which limit stroke of the pistons. The piston of the pump assembly is driven by a rack and pin assembly within the housing of the pump assembly and the pinion is driven by a pivotal linkage arrangement connected at one end directly to a front wheel steering knuckle arm which can cause erratic movement of the pump piston due to bounce of the wheel. In the 4,776,418 patent, movement of the actuator piston is transmitted directly to the rear wheels via an S-cam assembly which transmits same direction rear wheel steering for rather small front wheel steering angles and then opposite direction rear wheel steering for greater front wheel steering angles. Due to the limited stroke of the pistons and the arrangement of the S-cam assembly, the system is characterized by relatively high fluid pressure and reaction forces at the cams. The system also includes a rather expensive and complicated pressurized reservoir to ensure that the roll diaphragms are always under positive pressure and that fluid fill in the closed fluid flow branches does not vary due to temperature variations and/or leakage.

SUMMARY OF THE INVENTION

An object of the present invention is to improve the closed hydraulic system disclosed in the abovementioned patents.

Another object of the present invention is to provide valving for interconnecting variable volume chambers of a hydraulic cylinder when a piston in the cylinder that varies volumes is in a predetermined position.

Another object of the present invention is provided in a closed hydraulic system with the valving and hydraulic cylinders of the above object.

Another object of the present invention is to provide the closed hydraulic system of the above object with a fluid reservoir which is also interconnected with the variable volumes via the valving.

According to a feature of the invention, a hydraulic cylinder assembly includes a housing having a cylinder bore sealed at its ends, a piston slidably and sealingly disposed in the bore and defining in cooperation with the housing first and second volumes which varies inversely in response to to-and-fro axial movement about a neutral position of the piston in the bore, a ram affixed to the piston and slidably and sealingly extending through one end of the housing, first and second ports for respectively communicating the first and second volumes with a hydraulic circuit.

The invention is characterized by: first and second neutral valves fixed to with respect to the housing with each valve having a low pressure port normally closed by a valving member and each having a high pressure port; first and second passages for respectively communicating the first and second valve high pressure ports with the first and second volumes; a chamber for interconnecting the low pressure ports; and actuation means operative to move each valving member to the open position in response to movement of the piston to the neutral position and to allow each valving member to move to the normally closed position in response to a predetermined movement of the piston for the neutral position.

BRIEF DESCRIPTION OF THE DRAWINGS

A four wheel steering apparatus according to the present invention is shown in the accompanying drawings in which:

FIGS. 2A and 2B are a detailed sectional view of a pump assembly in the system of FIG. 1;

FIGS. 5 and 6 are sectional views of the actuator assembly respectively looking along lines 5—5 and 6—6 of FIGS. 4A and 4B;

FIG. 7 is an enlarged and rolled flat portion of a cylindrical portion of a piston in the actuator of FIGS. 4A and 4B;

FIGS. 8–10, 11A, 11B and 12 illustrate an alternative embodiment of the system in FIG. 1 and the components in FIGS. 2A, 2B and 3–7.

DETAILED DESCRIPTION OF THE DRAWINGS

Figure 1:
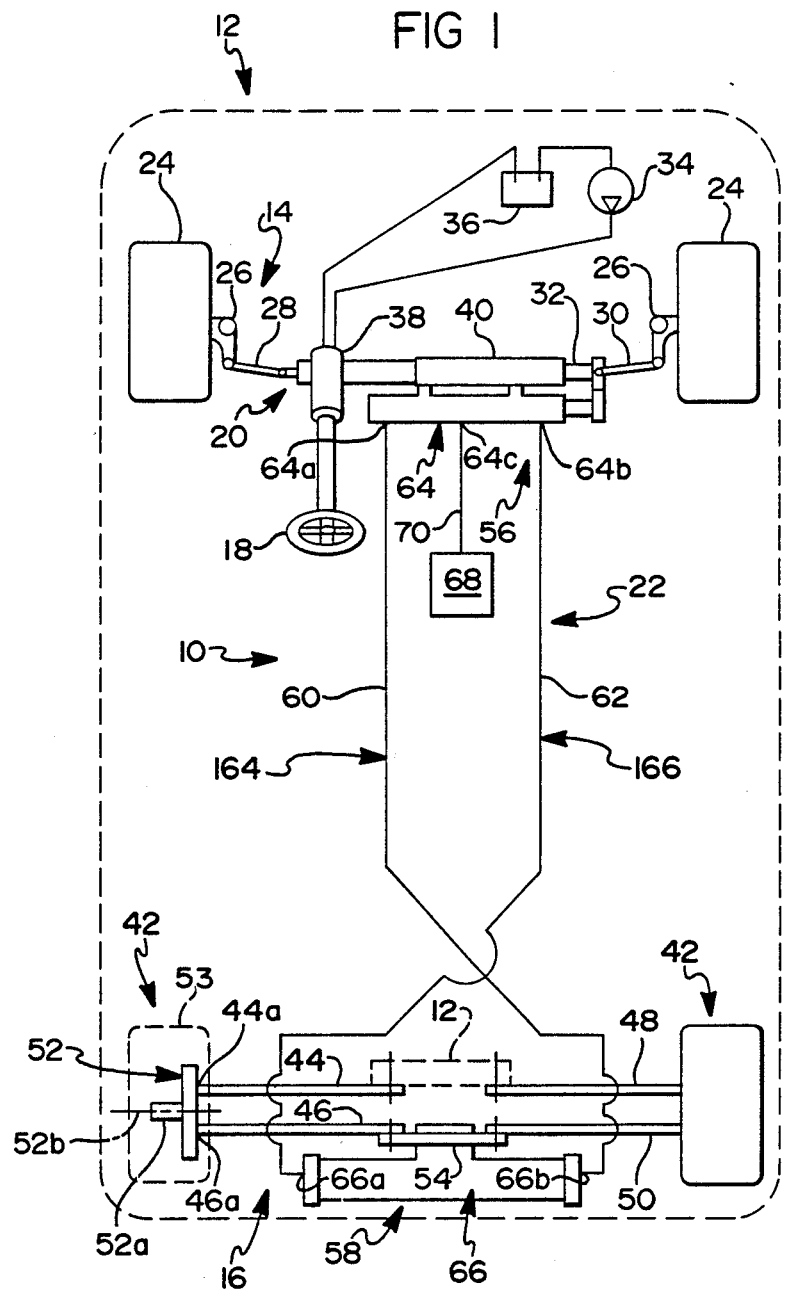
FIG. 1 is a schematic plan view of a vehicle steering system having the apparatus of the invention disposed between the front and rear wheel assemblies of a vehicle.

The schematic plan view of FIG. 1 illustrates a steering system 10 for a wheeled vehicle having a body and chassis represented by phantom line 12, and front and rear steerable wheel assemblies 14,16. The system includes a steering wheel 18, a power steering assembly or first means 20 for transmitting steering movement of the steering wheel to the front wheel steering assembly, and a closed hydraulic system or second means 22 for transmitting steering movement of the front wheel steering assembly to the rear wheel steering assembly.

The front wheel steering assembly 14 includes front wheels 24 each having a steering knuckle arm 26 pivotally connected together by tie rod ends 28,30 and a steer actuating ram 32 disposed for to-and-fro movement transverse to the longitudinal direction of the vehicle in known manner.

Steering assembly 20 may be any of several well known mechanical non-power or power steering assemblies which transmit steering movement to the front wheel steering assembly in response to steering movement of the steering wheel. Assembly 20 is preferably of the power steering type and, as illustrated therein, is of the well known hydraulic boost type including a source of pressurized hydraulic oil or fluid provided by a pump 34 in known manner, a sump 36, and a servo valve 38 for connecting or communicating the source and sump with opposite sides of a piston 32a (FIG. 2A) affixed to ram 32 and disposed in a power steering cylinder 40 affixed to the vehicle chassis. The tie rods 28,30 are pivotally connected at their opposite ends to one end of ram 32 and the associated knuckle arm 26. The tie rods move together in to-and-fro motion in response to alternate porting or communication of opposite sides of piston 32a with the source and sump by valve 38.

The rear wheel steering assembly 16 includes rear wheel assemblies 42 supported from the vehicle chassis 12 by pairs of transverse parallel swing links 44,46 and 48,50 which are connected at their outboard or wheel ends to wheel assembly stub axles in known manner, as schematically illustrated for the left rear wheel assembly; therein wheel ends 44a,46a of links 44,46 are attached to a stub axle assembly 52 having an axle portion 52a mounting a wheel 53 for rotation and track parallel to the longitudinal axis of the vehicle when not being steered right or left. End 44a is attached in front of axle portion center line 52a and end 46a is attached to the rear of the center line. The wheel ends of link pair 48,50 are attached to the right wheel assembly 42 in the same manner. The inboard ends 44b and 48b of links 44 and 48 are pivotally attached to the vehicle chassis 12 in known manner and are restrained at their pivot axes against movement relative to the chassis. The inboard ends 46b and 50b of links 46 and 50 are attached to a driven member 54 transversely movable relative to the chassis but otherwise retained against movement relative to the chassis in a manner explained further hereinafter.

Closed hydraulic system 22 includes a pump in the form of a hydraulic cylinder assembly 56, an actuator also in the form of a hydraulic cylinder assembly 58, and conduits or passages 60,62 respectively connected at one end to ports 64a,64b defined by a housing assembly 64 of the pump assembly and respectively connected at the other end to ports 66b,66a defined by a housing assembly 66 of the actuator assembly. System 22 also includes a reservoir 68 having a hydraulic fluid level exposed to atmospheric pressure and disposed vertically above the rest of the closed system 22 and connected thereto by a conduit 70 connected to a port 64c of the pump housing assembly 64.

Figure 2B:
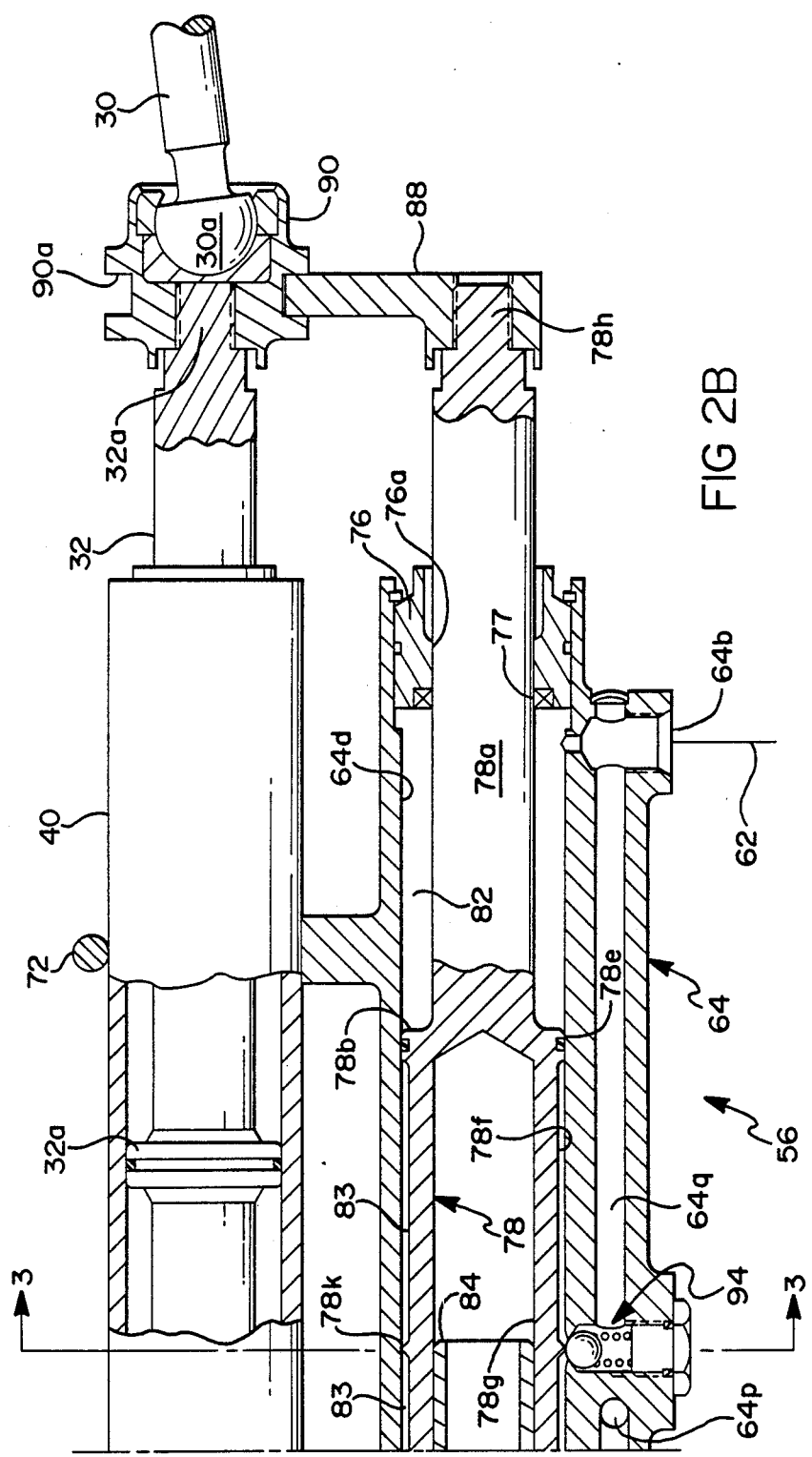
Figure 5:
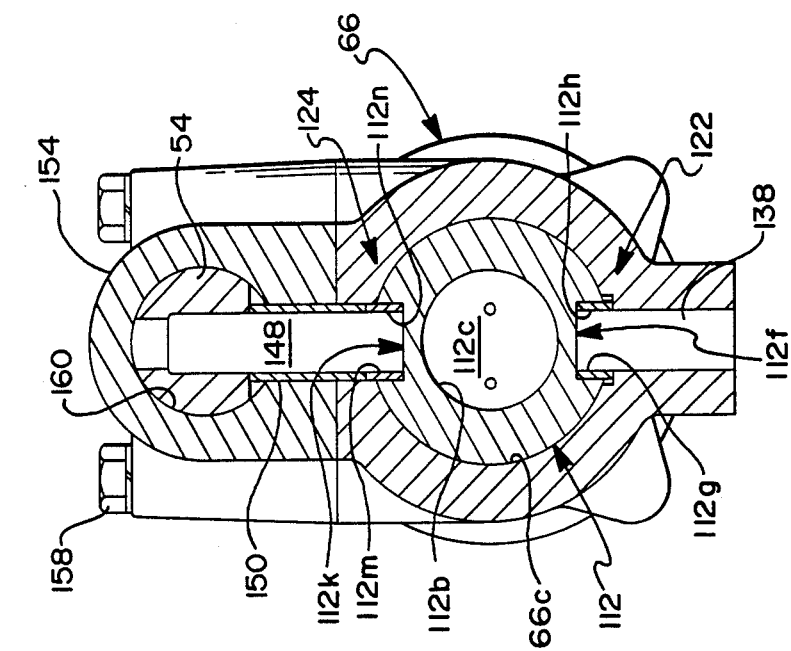
Figure 3:
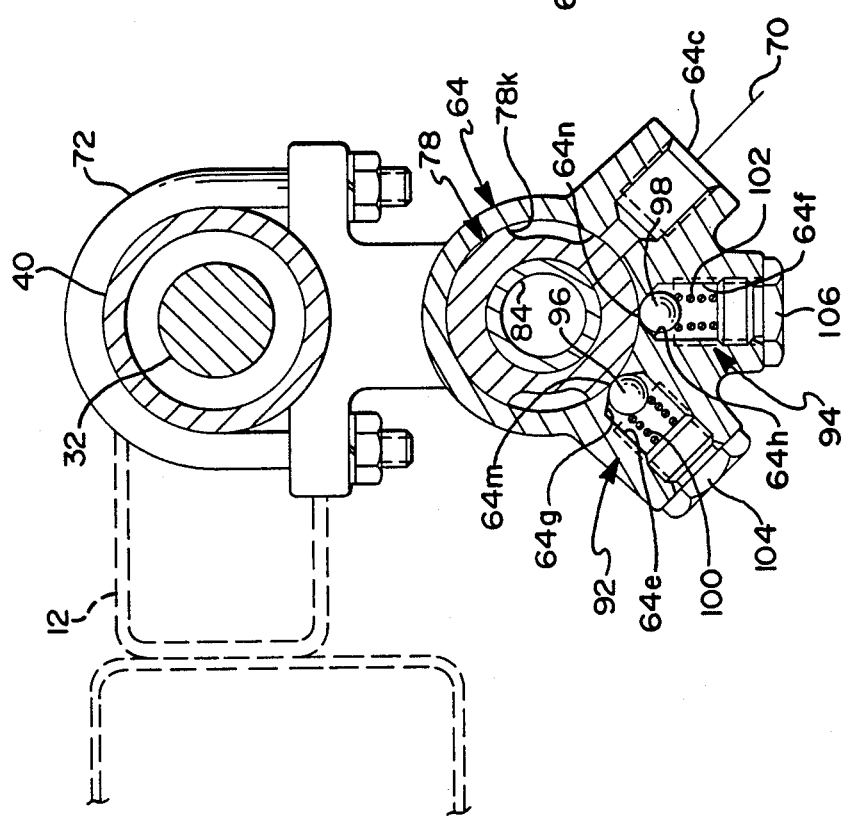
FIG. 3 is a sectional view of the pump assembly looking along line 3—3 of FIG. 2B.
Figure 4A:
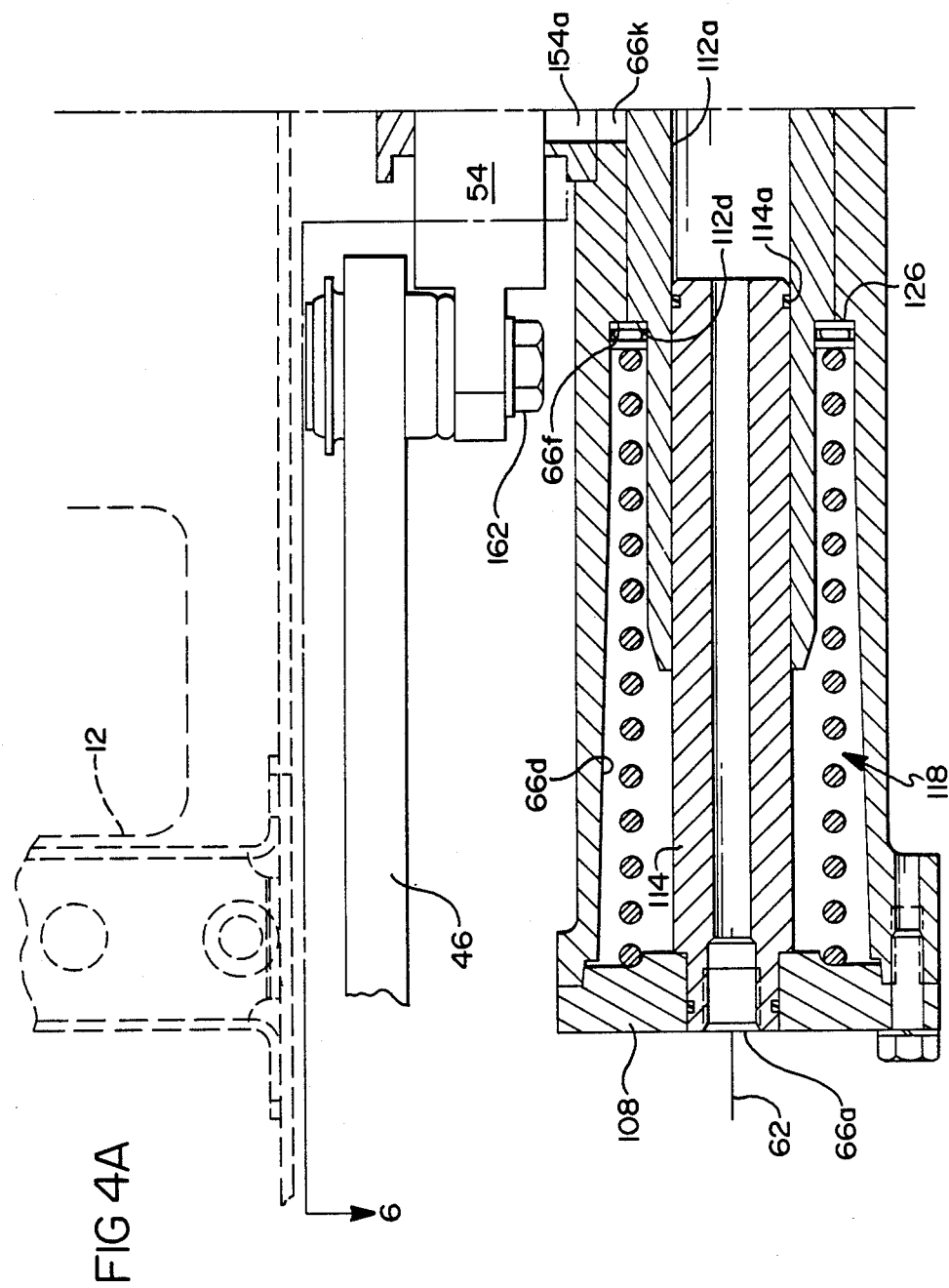
FIGS. 4A and 4B are a detailed sectional view of an actuator assembly in the system of FIG. 1.
Figure 4B:
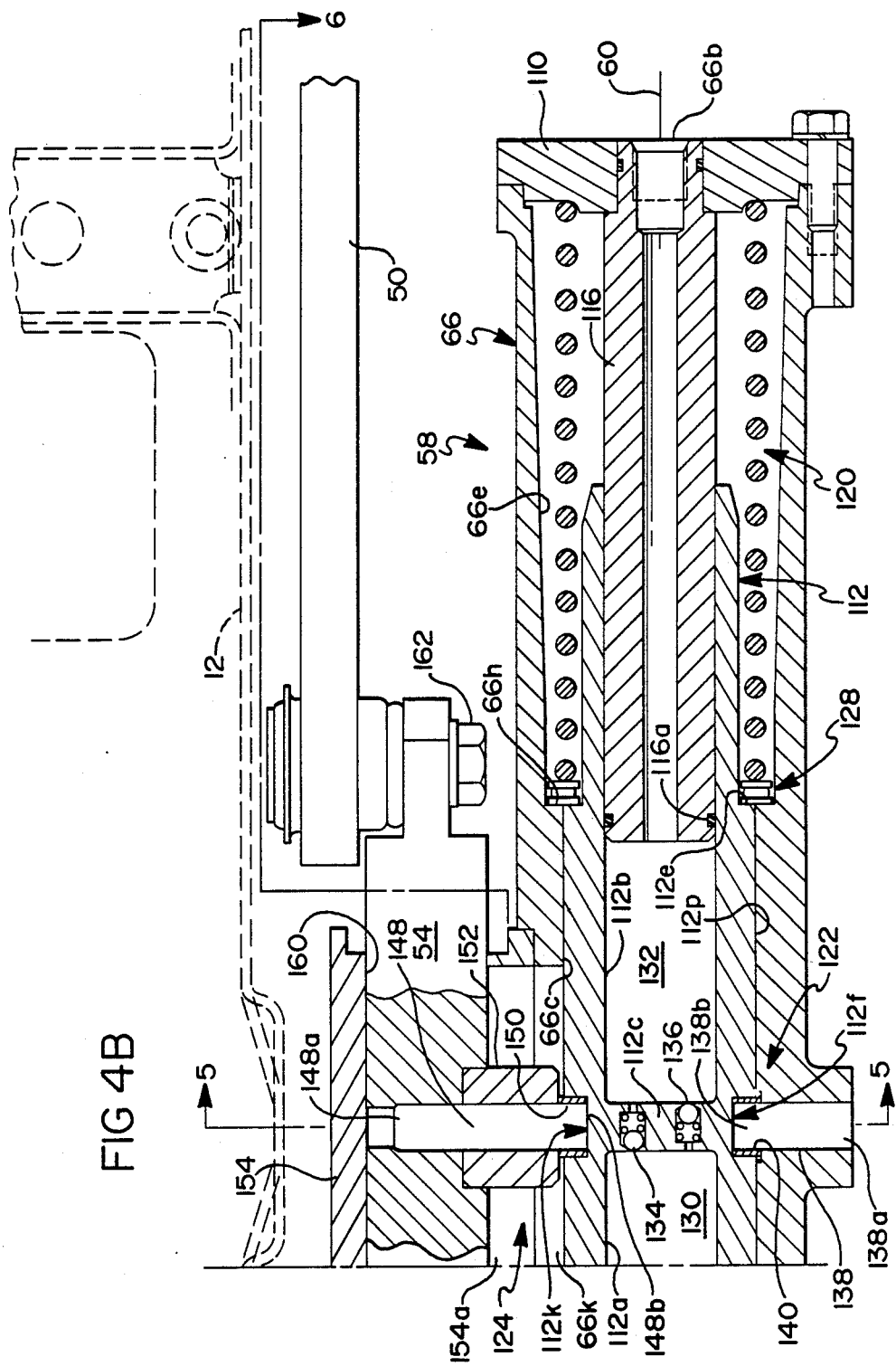

Looking now at FIGS. 2A, 2B, and 3, pump assembly 56 includes the housing assembly 64 affixed to power steering housing 40 by U-bolts 72 and having a cylindrical bore 64d with an axis extending parallel to and spaced from the axis of motion of ram 32, ends 74,76 for sealing the ends of the bore, a reciprocal piston 78 slidably disposed in the bore and having a ram 78a affixed thereto and slidably extending through an opening 76a in end 76. The interface of opening 76a and the ram is sealed by a dynamic seal 77. The piston includes axially oppositely facing ends 78b,78c of equal surface area defining variable volumes 80,82, axially spaced apart annular lands 78d,78e having annular grooves retaining seals to prevent direct fluid communication between the chambers, and a reduced diameter portion 78f between the annular lands which forms a chamber 83. A tube 84 of diameter equal to ram 78a is sealingly affixed to end 74 and slidably received by a bore 78g in the piston. The interface of bore 78g and the tube is sealed by a dynamic seal 86. Ram 78a is threadedly secured at its end 78h to a fork 88 received in an annular groove 90a of a member 90 which is threadedly secured on one side to an end 32b of ram 32 and which defines a ball socket retaining a ball end 30a of tie rod end 30. This arrangement of securing rams 32 and 78a together and affixing their housing together facilitates unitary assembly and installation of the assembly, ready adjustment of the rams relative to each other, and mitigates relative movement between the assemblies which can in service effect proper adjustment.

Looking now mainly at FIG. 3, the pump assembly also includes two neutral valve assemblies 92,94. The valves are operative when open to intercommunicate variable volumes 80,82, chamber 83 and reservoir 68 when the front wheels are being steered straight ahead and piston 78 is in the neutral position shown. Valve assemblies 92,94 respectively include ball-type valving members 96,98 disposed in bores 64e,64f extending radially of the axis of bore 64d and defining conical valve seats 64g,64h concentric to low pressure ports 64m,64n opening into chamber 83, springs 100,102 biasing the balls against the seats with a portion of each ball extending into chamber 83, threaded plugs 104,106 closing the bores and reaching the springs, and high pressure ports respectively communicating bores 64e,64f with ports 64a,64b via passages 64p,64q which in turn respectively communicates with variable volumes 80,82. Port 64c communicates reservoir 68 directly with chamber 83. A radially outwardly projecting portion 78k of piston 78 contacts and unseats the balls when the piston 78 is within a predetermined distance of its neutral position, e.g., a distance corresponding to about one-half degree of front wheel steer angle. Accordingly, when the neutral valves are open, reservoir 68 provides a head of fluid pressure for maintaining full fill of the hydraulic components in the closed hydraulic system.

Looking now at FIGS. 4A, 4B and 5-7, actuator assembly 58 includes the housing assembly 66 affixed to chassis 12 in any of several known but unshown manners, the housing member 66 including a cylindrical center bore 66c having an axis parallel to and spaced from the axis of driven member 54, bores 66d,66e of larger diameter defining shoulders 66f,66h at their terminus adjacent the ends of the center bore, ends 108,110 for sealing the ends of the bore, a reciprocal piston 112 slidably disposed in the center bore and having axially aligned bores 112a,112b therein separated by a wall 112c, tubes 114,116 sealingly affixed to ends 108,110 and slidably received by the bores 112a,114a in the piston, spring assemblies 118,120 biasing the piston in opposite directions to the shown neutral position wherein piston shoulders 112d,112e align with shoulders 66f,66h, and cam assemblies 122,124 for effecting to-and-fro rotation of the piston and to-and-fro axial movement of driven member 54 in response to to-and-fro axial movement of the piston. The spring assemblies include needle thrust bearings 126,128 to allow friction free rotation of the piston relative to the springs. The oppositely facing surfaces of piston wall 112c define the hydraulic working surfaces of piston 112 and define variable volumes 130,132 which respectively vary inversely with respect to variation in volumes 82,80 of the pump assembly. Piston wall 112c may include two relief valves 134,136 to relieve excessively high pressures in the system to prevent loss of front wheel steering. Dynamic seals in grooves 114a,116a of tubes 114,116 seal the chambers containing the spring assemblies from fluid in variable volumes 130,132.

Cam assembly 122 includes a helical groove 112f having axially spaced apart and radially extending side walls 112g,112h defining a constant helix angle formed into the outer cylindrical surface of piston 112, a cam follower 138 having an end 138a fixed to housing 66 and an end 138b having an anti-friction bearing 140 disposed in the groove. Since groove 112f has a constant helix angle, axial movement of the piston in the bore will provide a constant or fixed amount of piston rotation per unit of axial movement of the piston.

Cam assembly 124 includes a continuous helical groove 112k having axially spaced apart and radially extending side walls 112m,112n defining first, second and third portions 142,144,146 of different helix angles (see FIG. 7), and an axially movable cam follower 148 fixed at one end 148a to the driven member 54 at the other end 148b having an anti-friction bearing 150 disposed in groove 112k. Cam follower 148 is retained against circumferential movement relative to the axis of piston 112 by a slide block 152 intermediate the follower ends and disposed in an axially extending slide groove defined by aligned openings 66k in housing 66 and 154a in a housing member 154 affixed to housing 66 by a plurality of bolts 158. Housing member 154 defines a bore 160 allowing sliding movement of driven member 54 along an axis parallel to the axis of piston 112 and transverse to the vehicle chassis. The driven member 54 is pivotally secured to transverse links 46,50 via bolts 162.

In FIG. 7, the outer surface 112p of piston is rolled flat to illustrate the angular relation of cam 138,148 are positioned in the respective grooves at positions corresponding to the neutral position of the respective cam assemblies and the piston. In disclosed embodiment, the first portion 142 of variable helix groove 112k extends in both directions away from the neutral position and has a helix angle less than the helix angle of constant helix angle groove 112f; the second portions 144 extend both ends of portion 142 and have like helix angles which are greater than the helix angle of the constant helix angle groove, and the optional third portions 146 extend the adjacent ends of portions 144 and have like helix angles which are equal to the helix angle of the constant helix angle groove.

The cam arrangement of FIG. 7 causes cam follower 148 to move axially in a direction opposite to the direction of axial movement of piston 112 when follower 148 is in first portion 142, causes follower 148 to move axially in the same direction of axial movement of the piston with a greater relative per unit movement when the follower is in portions 144, and causes no further relative movement of the piston and follower 148 when in the third portions.

To determine movement of axially movable follower 148 relative to axial movement of piston 112 it is important to remember that the piston outer surface 112p moves axially and rotates relative to both followers, follower 138 does not move, and followers 138,148 are always 180 rotational degrees apart. Accordingly, in FIG. 7, vertical line $X_0$ represents the neutral positions of the cam followers, line pairs $R_{01}$-$R_{02}$, $R_{11}$-$R_{12}$ and $R_{21}$-$R_{22}$ are 180 degrees apart. Line pair $R_{01}$-$R_{02}$ cross line $X_0$ at the neutral positions of followers 138, 148, respectively. Line $X_1$ represents a leftward axial movement of piston 112 which causes follower 138 to be positioned at its intersection with lines $X_1$ and $R_{11}$ and follower 148 to be positioned at the intersection of lines $P_1$ and $R_{12}$. Since the intersection of lines $P_1$ and $R_{12}$ is to the left of the intersection of lines $X_1$ and $R_{11}$, follower 148 has moved leftward relative to fixed follower 138 an amount equal to the distance between $P_1$ and $X_1$. Line $X_2$ represents a further leftward axial movement of piston 112 which causes follower 138 to be positioned at the intersection with lines $X_2$ and $R_{22}$ and follower 148 to be positioned at the intersection of lines $P_2$ and $R_{21}$. Since the intersection of lines $P_2$ and $R_{22}$ is to the right of the intersection of the lines $X_2$ and $R_{22}$, follower 148 has moved rightward relative to fixed follower 138.

As thus far described, conduit 60, pump volume 80 and actuator volume 132 define a first closed fluid flow branch 164; and conduit 62, pump volume 82 and actuator volume 130 define a second closed fluid flow branch 166. Since the branches are filled with a non-compressible hydraulic oil, sliding movement of pump piston 78 in response to steering movement of the steer assembly ram 32 causes fluid flow in both branches and corresponding sliding movement of actuator piston 112 with resultant movement of the rear transverse links 46,50 which causes the rear wheels to pivot about their pivotal connection to the front transverse links 46,48. Should the steering wheel be turned to effect a left steer angle of the front wheels, ram 32 and pump piston 78 will move rightwardly, thereby effecting a flow of fluid in branch 164 from volume 82 of the pump to volume 130 of the actuator assembly and a reverse flow in branch 166 with respect to volumes 80,132. For relatively small front steer angles, this flow is sufficient to move the piston rightwardly only within first portion 142, thereby moving driven member 54 rightwardly to effect same direction steer angles of the rear wheels. For relatively large front steer angles, the flow is sufficient to move the piston into second portions 144, thereby reversing the direction of the driven member to effect opposite direction steering of the rear wheels.

Figure 8:
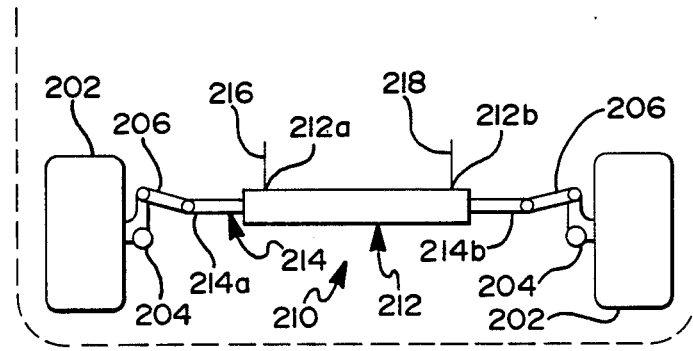

Looking now at FIGS. 8-12, therein is an alternative embodiment 200 of rear steering system 22 shown in FIGS. 1-7. In the alternative embodiment, the front steering assembly is as shown in FIG. 1, the rear wheels 202 as shown in FIG. 8 are steered by steering knuckles 204 and tie rod ends 206 analogous to the front steering knuckles and tie rod ends. A modified pump assembly 208 shown in FIGS. 9 and 10 embodies the basic inventive features of pump assembly 56. A modified actuator assembly 210 shown in FIGS. 11A, 11B and 12 embodies the basic inventive features of actuation assembly 58. The pump and actuator assembly of both embodiments are interchangeable.

With brief reference to FIG. 8, actuator assembly 210 is secured to the vehicle chassis in a manner analogous to that of actuator assembly 58, and includes a housing 212 having a through ram 214 pivotally secured at its ends 214a,214b to tie rod ends 206 in a manner analogous to that of ram 32 in FIG. 2B. Housing 212 includes ports 212a,212b connected to conduits 216,218 respectively analogous to conduits 60,62 of system 22.

Pump assembly 208, as shown in FIGS. 9 and 10, includes a housing 220 affixed to the power steering housing 40 by U-bolts 76 and having a cylindrical bore 220a with an axis extending parallel to and spaced from the axis of motion of ram 32, ends 222,224 for sealing the ends of the bore, a reciprocal piston 226 slidably disposed in the bore and having rams 226a,226b affixed thereto and slidably extending in opposite directions through openings 222a,224a in the ends 222,224. The piston includes axially oppositely facing hydraulic working surfaces 226c,226d of equal surface area defining variable volumes 228,230, communicating directly with ports 220b,220c and annular grooves retaining seals 232 to prevent direct fluid communication between the variable volumes. Housing 220 includes a second bore or chamber 220d with an axis extending parallel to and spaced from the axis of bore 220a, ends 234,236 for sealing the ends of the bore, a rod 238 slidably and sealingly extending through end 236. An end 238a of the rod external of bore 220d is threadedly secured to the fork 88 which is secured to ram 226b and received by groove 90a in the same manner as in FIG. 2B. The other end of rod 238 includes a radially outwardly projecting portion 238b analogous to portion 78k in FIGS. 2B and 3.

Housing 220 also includes two neutral valve assemblies 240,242, functionally and structurally the same as valves 92,94, and having ball-type valving members 244,246 which, when seated, project into chamber 220d and are unseated by projecting portion 238b of rod 238 when piston 226 is in the neutral position. Chamber 220d continuously communicates with the reservoir 68 via a port 220e and a conduit 248. Variable volumes 228,230 continuously communicate with high pressure ports of valves 240,242 via passages 220f and 220g.

Figure 12:
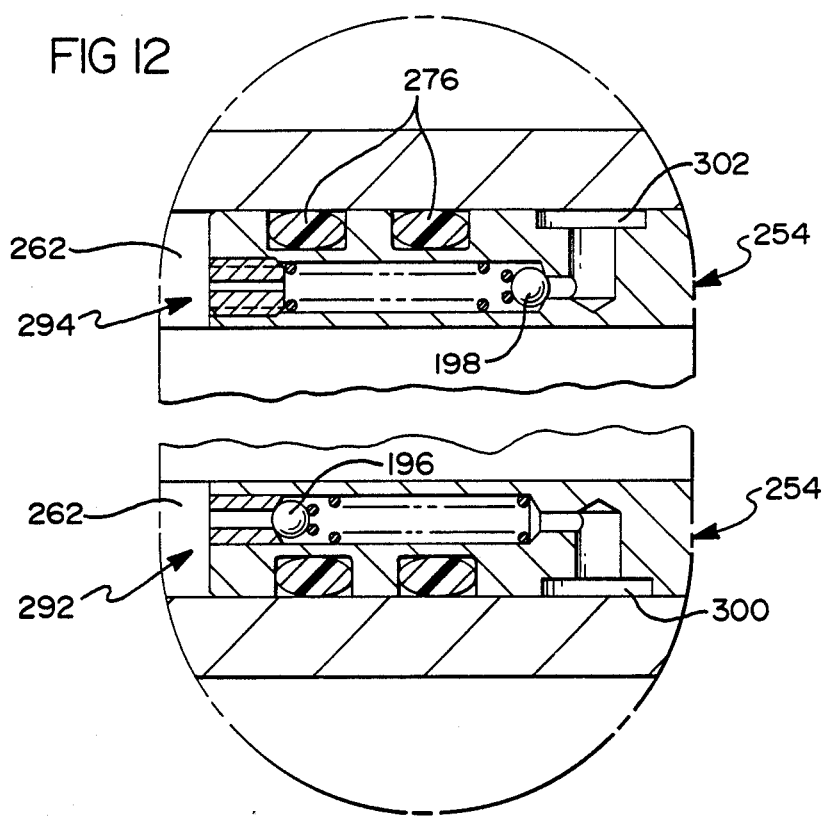

Looking now at actuator assembly 210 in FIGS. 11A, 11B and 12, the actuator includes the housing 212 affixed to the chassis in a manner analogous to that of actuator assembly 58. The housing includes a cylindrical bores 212c,212d, ends 250,252 for sealing the ends of the bores, a reciprocal piston 254 slidably disposed in bore 212c and having a through bore 254a with the ram 214 slidably extending therethrough, a pin 255 fixed at both ends to housing 212 and extending through a slot 214c in the ram to prevent rotation of the ram, a double acting spring assembly 256 biasing the piston in opposite directions to the shown neutral position wherein piston shoulder 254b aligns with a shoulder 212e, and cam assemblies 258,260 for effecting rotation of the piston and to-and-fro axial movement of ram 214 in response to to-and-fro axial movement of the piston. The piston includes axially oppositely facing ends of equal surface area defining volumes 262,264 which vary inversely in volume with respect to variations in volumes 228,230 of the pump assembly. The spring assembly 256 includes a cylindrical member 266 having slotted openings 266a and radially extending flanges 266b,266c at its opposite ends, a spring retainer 268 for limiting rightward axial movement of member 266, a retainer/anti-friction thrust bearing 270 for pulling member 266 rightward with piston 254 and for allowing rotation of the piston relative to the member, and an anti-friction thrust bearing 272 for allowing rotation of the piston relative to a spring 274 sandwiched between the bearing and flange 266b. The left interface of piston 254 with housing bore 212c is sealed by dynamic seals 276, and the right interface of piston 254 with ram 214 is sealed by dynamic seals 280. This seal arrangement allows system fluid to lubricate the sliding interfaces and the cam assemblies.

Cam assemblies 258,260 may be the same as cam assemblies 122,124 wherein the fixed cam follower reacts in the cam groove of constant helix angle and the axially movable cam follower reacts in the cam groove of variable helix angle. However, herein a fixed cam follower 282 preferably reacts in a cam groove 284 of variable helix angle and an axially movable follower 286 reacts in a cam groove 290 constant helix angle. This reversed roll of the cam grooves requires the first portion of groove 284 to have a helix angle greater than the helix angle of the groove 290 and the second portion groove 284 to have a helix angle less than the helix angle of groove 290.

Actuator assembly 58 may also be provided with two relief valves 292,294 to relieve excessively high pressures in the system the valves are shown enlarged in FIG. 12. Valve 292 includes a spring loaded ball-type valving member 296 for relieving pressure in volume 262 and valve 294 includes a spring loaded ball-type valving 298 member for relieving pressure in chamber 264. The respective inlet and outlets 300,302 of the valves freely communicate with volume 264 via radial spacing between parts of housing bore 212c and piston 254.

A preferred embodiment of the invention has been disclosed herein for illustrative purposes. Many variations and modifications of the disclosed embodiment are believed to be within the spirit of the invention. The following claims are intended to cover inventive portions of the disclosed embodiment and variations and modifications believed to be within the spirit of the inventive portions.

What is claimed is:

1. A hydraulic cylinder assembly including a housing having a cylindrical bore at its ends, a piston slidably and sealingly disposed in the bore and defining in cooperation with the housing first and second volumes which vary inversely in to to-and-fro axial movement about a neutral the piston in the bore, a ram affixed to the an slidably and sealingly extending through one e of the housing, first and second ports for respectively communicating the first and second volumes with a hydraulic circuit; characterized by:

first and second neutral valves fixed with respect to the housing, each valve having a low pressure port normally closed by a valving member and a high pressure port;

first and second means for respectively communicating the first and second valve high pressure ports with the first and second volumes;

chamber means for intercommunicating the low pressure ports; and actuation means operative to move each valving member to the open position in response to movement of the piston to the neutral position and operative to allow each valving member to move to the normally closed position in response to a predetermined movement of the piston from the neutral position.

2. The cylinder assembly of claim 1, wherein each neutral valve includes a valve seat circumscribing the low pressure port, a spring biasing the valving member against the valve seat, and a portion of the valving member protruding through the low pressure port and into the chamber means; and wherein the actuation means is operative to contact the protruding portion of each valving member and unseat the valving member when the cylinder assembly is in the neutral position.

3. The cylinder assembly of claim 2, wherein each valving member is of the ball type.

4. The cylinder assembly of claim 2, wherein the piston includes axially spaced apart seal assemblies cooperating with the cylindrical wall of the bore and a reduced diameter portion between seal assemblies defining the chamber means, the protruding portion of each valve member extending radially inward into the reduced diameter portions, and the actuation means being defined by radially outward extending portions of the piston.

5. The cylinder assembly of claim 4, wherein each valving member is of the ball type.

6. The cylinder assembly of claim 2, wherein the housing includes a second bore sealed at its ends, being radially spaced from and parallel to the cylindrical bore, and defining the chamber means; a second ram having an end portion disposed in the second bore and defining the actuation means with the other end slidably and sealing extending through one end of the housing and affixed for movement with the ram affixed to the piston.

7. The cylinder of assembly of claim 6, wherein each valving member is of the ball type.

8. A steering appartus for a wheeled vehicle having front and rear dirigible wheel assemblies, the apparatus comprising:

first means for transmitting left and right steering movement to a front wheel steering assembly in response to a steering wheel being turned left and right from a neutral position to effect left and right steering angles of the front wheels, second means for transmitting steering movement to a rear wheel steering assembly in response to steering movement of the front wheel steering assembly; the second means characterized by:

a closed hydraulic system including first and second closed fluid flow branches comprising a fluid displacement assembly operative to effect fluid flow in both branches in response to steering movement of the front wheel steering assembly;

a hydraulic actuator assembly operative to effect steering movement of the rear wheel steering assembly in response to said fluid flow, the fluid in the branches alternately increasing from a low pressure to an operational pressure in response to alternate steering movement of the front wheel steering assembly;

the fluid displacement assembly including:

a hydraulic cylinder assembly including a housing having a cylindrical bore sealed at its ends, a piston slidably and sealingly disposed in the bore and defining in cooperation with the housing first and second volumes which vary inversely in response to to-and-fro axial movement about a neutral position of the piston in the bore, a ram affixed to one end of the piston and slidably and sealingly extending through one end of the housing, first and second ports for respectively communicating the first and second volumes with the first and second fluid flow branches; characterized by:

first and second neutral valves fixed with respect to the housing, each valve having a low pressure port normally closed by a valving member and a high pressure port;

first and second passage means for respectively communicating the first and second valve high pressure ports with the first and second volumes;

chamber means for intercommunicating the low pressure ports; and actuation means operative to move each valving member to the open position in response to movement of the piston to the neutral position and operative to allow each valving member to move to the normally closed position in response to a predetermined movement of the piston from the neutral position.

9. The steering apparatus of claim 8, wherein the closed hydraulic system includes a hydraulic fluid reservoir having a normal fluid level exposed to atmospheric pressure, disposed vertically above the fluid flow branches and in continuous communication with the chamber means.

10. The steering apparatus of claim 8, wherein each neutral valve includes a valve seat circumscribing the low pressure port, a spring biasing the valving member against the valve seat, and a portion of the valving member protruding through the low pressure port and into the chamber means; and wherein the actuation means is operative to contact the protruding portion of each valving member and unseat the valving member when the cylinder assembly is in the neutral position.

11. The steering apparatus of claim 10, wherein each valving member is of the ball type.

12. The steering apparatus of claim 10, wherein the closed hydraulic system includes a hydraulic fluid reservoir having a normal fluid level exposed to atmospheric pressure, disposed vertically above the fluid flow branches and in continuous communication with the chamber means.

13. The steering apparatus of claim 10, wherein the piston includes axially spaced apart seal assemblies cooperating with the cylindrical wall of the bore and a reduced diameter portion between the seal assemblies defining the chamber means, the protruding portion of each valve member extending radially inward into the reduced diameter portions, and the actuation means being defined by radially outward extending portions of the piston.

14. The steering apparatus of claim 13, wherein each valving member is of the ball type.

15. The steering apparatus of claim 13, wherein the closed hydraulic system includes a hydraulic fluid reservoir having a normal fluid level exposed to atmospheric pressure, disposed vertically above the fluid flow branches and in continuous communication with the chamber means.

16. The steering apparatus of claim 10, wherein the housing assembly includes a second bore sealed at its ends, being radially spaced from and parallel to the cylindrical bore, and defining the chamber means; a second ram having an end portion disposed in the second bore and defining the actuation means with the other end slidably and sealing extending through one end of the housing and affixed for movement with the ram affixed to the piston.

17. The steering apparatus of claim 16, wherein each valving member is of the ball type.

18. The steering apparatus of claim 16, wherein the closed hydraulic system includes a hydraulic fluid reservoir having a normal fluid level exposed to atmospheric pressure, disposed vertically above the fluid flow branches and in continuous communication with the chamber means.

19. A closed hydraulic system comprising:

first and second hydraulic cylinder assemblies each including a housing having a cylindrical bore sealed at its ends, a piston slidably and sealingly disposed in the bore and defining in cooperation with the housing first and second volumes which vary inversely in response to to-and-fro axial movement about a neutral position of the piston in the bore, means for intercommunicating the first volumes and means for intercommunicating the second volumes, the first hydraulic cylinder assembly including a ram affixed to the piston and slidably and sealingly extending through one end of the housing; characterized by:

the first hydraulic cylinder assembly including neutral valve means fixed with respect to the housing of the first hydraulic cylinder assembly, the valve means having low pressure port means normally closed by a valving means and a high pressure port means, passage means for communicating the high pressure port means with the first and second volumes of the first hydraulic cylinder assembly, chamber means communicating with the low pressure port means, and actuation means operative to move each valving means to the open position in response to movement of the piston to the neutral position and operative to allow the valving means to move to the normally closed position in response to a predetermined movement of the piston from the neutral position; and the second hydraulic cylinder assembly including first cam means reacting between the housing and piston of the second hydraulic cylinder assembly for effecting to-and-fro rotation of the piston in the bore thereof about a neutral position of the cam means in response to to-and-fro axial movement of the piston about the neutral position of the piston driven means, and second cam means reacting between the piston and the driven means of the second hydraulic cylinder assembly for effecting to-and-fro movement of the driven means in response to the rotation of the piston.

20. The closed hydraulic system of claim 19, wherein the neutral valve means includes first and second valves each having a low pressure port defining the pressure port means, a valving member defining the valving means, and a high pressure port defining the high pressure port means, first and second passages defining the passage means respectively communicating the high pressure ports of the first and second valves with the first and second volumes, the chamber intercommunicating the first and second low pressure ports, and the actuation means operative to move each valving member to the open position in response to the movement of the piston to the neutral position and operative to allow each valving member to move to the normally closed position in response to the predetermined movement of the piston from the neutral position.

* * * * *